United States Patent [19]
Hastrup

[11] 3,784,389
[45] Jan. 8, 1974

[54] METHOD OF AND APPARATUS FOR BURNING CEMENT INCLUDING ATOMIZING DRYER IN CYCLONE PREHEATER BYPASS

[75] Inventor: Niels Erik Hastrup, Copenhagen-Valby, Denmark

[73] Assignees: F. L. Smidth & Co., Cresskill, N.J.; Atkieselskabet Niro Atomizer, Copenhagen, Denmark; part interest to each

[22] Filed: Jan. 21, 1972

[21] Appl. No.: 219,758

[30] Foreign Application Priority Data
Feb. 22, 1971    Great Britain ..................... 5124/71

[52] U.S. Cl. .................................. 106/100, 432/106
[51] Int. Cl. .............................................. C04b 7/02
[58] Field of Search ..................... 263/32, 21 A, 53; 432/58, 106; 106/100

[56] References Cited
UNITED STATES PATENTS
3,365,521   1/1968   Brachthauser .................... 263/53 R
3,512,340   5/1970   Golucke et al. ................... 263/32 R

*Primary Examiner*—John J. Camby
*Attorney*—Dean S. Edmonds et al.

[57] ABSTRACT

In the manufacture of cement clinker from cement raw materials containing an undesirably high amount of alkalis, a rotary kiln having a preheater for the raw materials is employed. A portion of the effluent gases from the kiln is caused to bypass the preheater as a separate divisional flow. Water is atomized into this flow in such amounts that substantially all of the alkalis entrained therein in the form of solids, liquid or vapor are struck by the atomized fine drops of water. All of the water is vaporized in the hot flow of gas so that a substantial part of the alkalis is precipitated in the form of a fine dry powder, and the gas is simultaneously cooled.

22 Claims, 4 Drawing Figures

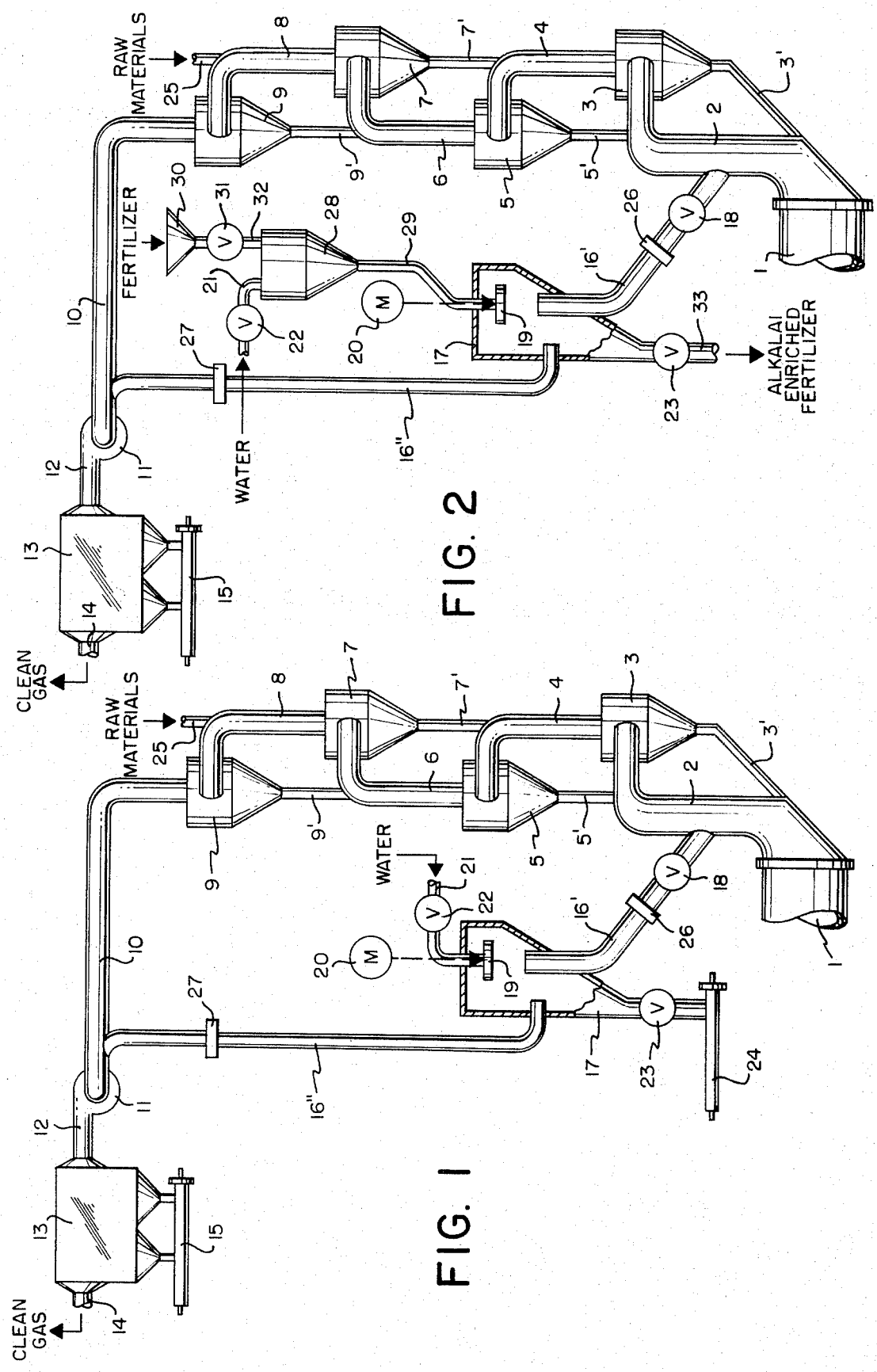

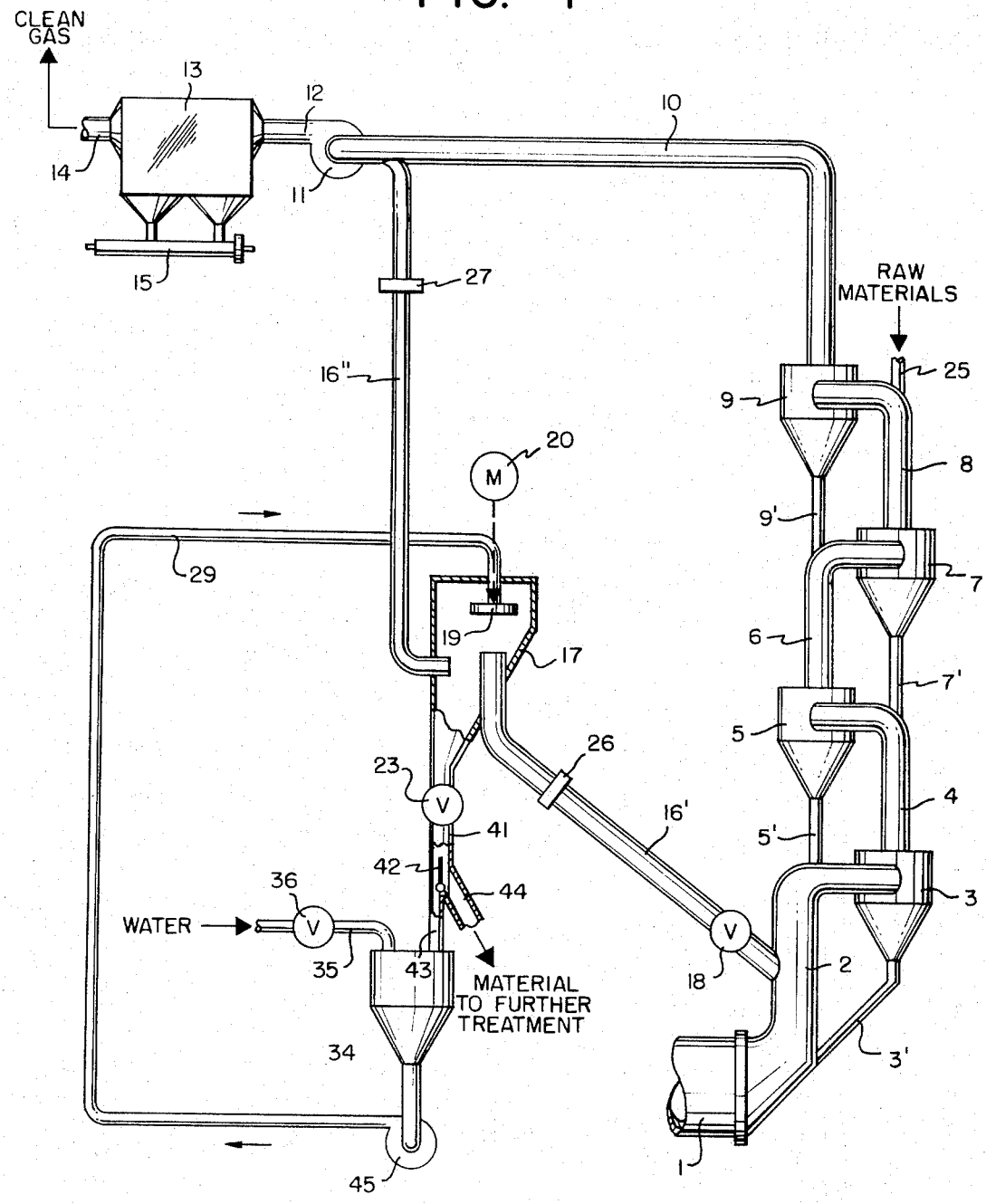

METHOD OF AND APPARATUS FOR BURNING CEMENT INCLUDING ATOMIZING DRYER IN CYCLONE PREHEATER BYPASS

BACKGROUND OF THE INVENTION

In the production of cement clinker in a rotary kiln by burning cement raw materials, a problem that arises when these materials contain volatile constituents in the form of alkalis, normally as sulphates and carbonates, and chlorine compounds (all of which may most conveniently be called alkalis) is well known. It is that, in the calcining and burning stages in the kiln, some of these constituents are volatilized and carried out of the calcining zone in the exhaust gases of combustion. Commonly the kiln is combined with a preheater for the raw materials which is usually a suspension preheater, and when the gases meet the cooler raw materials in the preheater the volatilized constituents condense on the particles of the raw materials.

A high content of alkali imparts a clogging tendency to raw materials and the alkali content may become so large that the hot raw materials cake on the walls of the preheater. Moreover, the greater part of the alkalis reintroduced into the kiln together with fresh preheated raw materials, and the alkali content of the materials in the kiln, increases until a certain state of equilibrium is attained. If the alkali content in the kiln builds up above a given value, it becomes more difficult to control the burning process in the kiln and the quality of the cement produced on grinding the clinker deteriorates.

Various solutions of the problem thus presented are known. When the preheater is of the suspension type, the dust and solid particles carried out of the kiln by the hot gases are largely separated in the preheater and returned to the kiln. One solution of the problem comprises reducing the amount of alkali-containing dust and solid particles returned from the preheater to the kiln by causing part of the gases from the kiln to bypass the preheater. The bypass stream of gases of course carries dust and solid particles, and as these are not separated in the preheater because they are bypassing it a specific separator is normally provided in the path of the bypass stream for the removal of the particles. However, this is not a complete solution in itself, because in modern practice a dust precipitator such as an electrostatic precipitator is invariably provided to remove the ramaining dust from the gases after they leave the preheater and before they enter the atmosphere, and this dust should be returned to the kiln. If, however, it includes the dust carried in the bypass stream, too much alkali may again be carried into the kiln.

To remove the dust from the bypass stream is not simple. It is possible to wash dust out of gases by passing the gases through a water scrubber, and it is known to make use of this process for the purpose of removing alkalis from the bypass stream of hot gases. However, the result is that the particles move downwards to form and be collected as a slurry. Such a slurry tends to solidify on the walls of the scrubber and elsewhere and so to cause trouble in operation. Moreover it is desirable to recover the particles of the raw materials in it, and this is a troublesome and time-consuming process. In addition the process involves considerable consumption of water; which is sometimes difficult to satisfy.

Another form of apparatus for bringing water into contact with hot gases is a cooling tower. In such an apparatus the primary object is to cool the gases, not to remove impurities therefrom, and so substantially all the impurities remain suspended in the gases and are carried out with them. Accordingly, while a cooling tower is useful as a means to prevent the dust precipitator from being passed by too hot gases, it is not suitable as a separator in the bypass stream.

SUMMARY OF THE INVENTION

According to the present invention, in a method of manufacturing cement clinker in a rotary kiln equipped with a materials preheater, from cement raw materials having an undesired high content of alkalis, a part of the effluent gases from the rotary kiln is caused to bypass the raw materials preheater as a separate divisional flow into which water is atomized in such amounts that substantially all the alkalis entrained in this separate flow in the form of solids, liquid or vapour are struck by the fine drops of water, and all the water is vaporized in the hot flow of gas so that a substantial part of the alkalis is precipitated from the gas flow in the form of a fine dry powder and the gas is simultaneously cooled.

The atomization of the water into the bypass stream is advantageously effected in an atomizer closely resembling or even identical with a conventional spray dryer. However, the method of use is unconventional, since in the conventional spray dryer what is atomized is an aqueous solution from which the water is instantly vaporised to leave, for example, such solids as coffee or milk in powder form. In the invention water is atomized to bring about sedimentation of powder in the hot gases.

Despite what has just been stated about the inventive idea of feeding a spray dryer with pure water rather than with some aqueous solution as known, the invention does, in fact, embrace the case where the water atomized into the bypassed flow of exit gas contains suspended solid particles of a carrier material to which part of the alkalis clog at the vaporization of the water so that alkali-enriched carrier material will be incorporated in the fine dry powder precipitated from the gas flow. The presence of such carrier material in the water will in some cases improve the efficiency of the spray dryer as a separator.

In such cases, according to the invention, the carrier material may advantageously be constituted by a pulverised fertilizer the effect of which may be improved by an addition of alkalis, whereby the dry, fine powder precipitated from the gas flow becomes a fertilizer powder thus enriched in alkalis. Thus, three aims are achieved, alkaline dust is separated from the bypassing gas flow, the said gas flow is cooled, and an available pulverulent fertilizer has been improved.

Alternatively, according to the invention the carrier material may be constituted by a certain fraction of the fine dry alkali powder previously precipitated from the gas flow. In this case a readily available material is made use of as carrier material, viz. a material which originates from the process and takes part therein.

A third possibility of selection of carrier material is a readily filtrable substance which after treatment in the spray dryer will constitute a part of the fine dry alkali containing powder precipitated from the gas flow. A further feature of the invention consists in that case in that the powder is suspended in water and the suspension subsequently filtered so as to produce partly a cake of slurry containing the carrier material and impurities from the exit gases and partly water in which the alkalis are dissolved.

The readily filtrable substance may advantageously be raw materials or sand. In the former case the slurry or filter cake may be utilized in the process by being fed into the kiln together with the raw materials, and the alkalis dissolved in the filter water may be utilized, if desired, e.g. as a fertilizer when the water has been evaporated.

In the latter case the alkalis may still be utilized as indicated, whereas the sand containing slurry cake may not in all cases simply be fed into the rotary kiln.

The volume of the bypass stream is preferably from 2 to 12 percent of that of the gases leaving the kiln. Such a proportion is adequate to eliminate the injurious effects produced by the alkali in the raw materials.

The amount of gas bypassing the preheater may be varied automatically depending on the alkali content of the gases leaving the kiln, the higher the content the greater the proportion of the gases that form the bypass stream. For such automatic variation a flame photometer may be used as sensor.

Naturally the amount of water introduced into the bypass stream should depend upon the volume of that stream, and may be automatically controlled depending on this or on the temperature of the gas after it has given off heat to the spray drying process. It is desirable that this temperature should be reduced to a figure of or below 350°C, and the temperature should not be lower than from 80° to 100°C.

Although it is most convenient to cause the bypass stream to flow at all times, even though its volume may be regulated as just described, the bypass flow may be intermittent, being effected periodically at predetermined intervals. Again, if the quality of the raw materials varies, so that alkalis no longer form a problem, the bypass may be cut off altogether until such time as the alkali problem arises again.

When the final dust precipitator is of the electrostatic type it is desirable that the dust-laden gases entering it should be moist, and if the moisture enriched bypass stream and the main stream are united before entering an electrostatic dust precipitator the combined stream will contain a suitable amount of moisture.

The invention also includes a rotary kiln apparatus plant, for carrying out the above process, which in addition to the rotary kiln, comprises a raw materials suspension preheater coupled to the rotary kiln, an effluent gas bypass pipe bypassing the suspension preheater, a spray dryer inserted in the bypass pipe and equipped with means for introducing water which may contain a suspended carrier material, into the spray dryer in the form of very fine drops, and with means for catching and removing the greater part of the precipitated alkalis in the form of a fine dry powder.

BRIEF DESCRIPTION OF THE SEVERAL VIEWS OF THE DRAWINGS

Examples of apparatus according to the invention are shown in the accompanying drawings, in which:

FIG. 1 shows a plant designed for feeding the spray dryer with pure water;

FIG. 2 shows a plant designed for feeding the spray dryer with a suspension in water of a pulverulent fertilizer deficient in alkalis;

FIG. 4 shows a plant designed for feeding the spray dryer with a suspension in water of a certain fraction of the dry, fine alkali powder previously precipitated from the gas flow.

DETAILED DESCRIPTION

Figure 3:
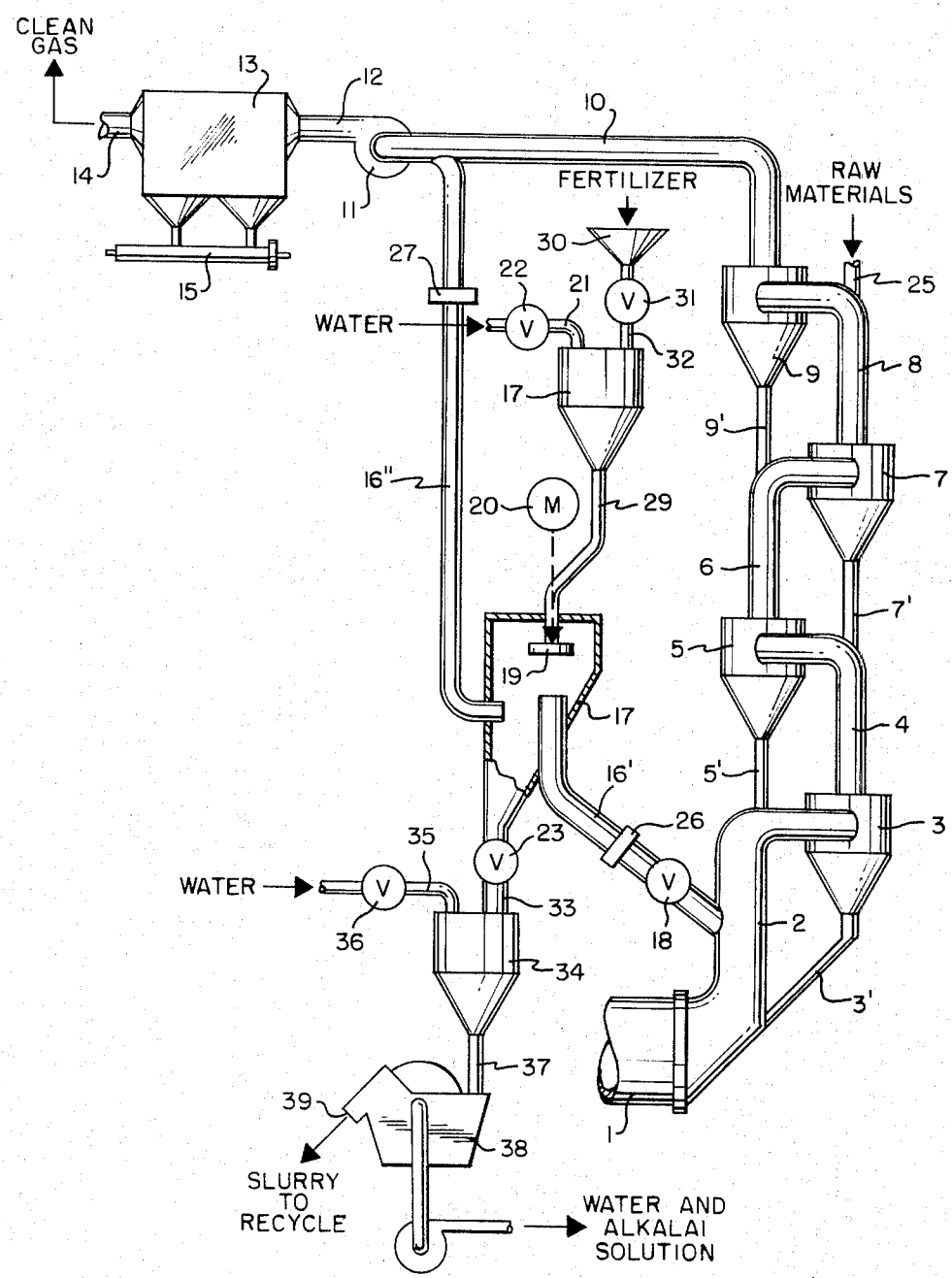
FIG. 3 shows a plant designed for feeding the spray dryer with a suspension in water of a readily filtrable substance such as sand or raw materials.

In FIG. 1 the upper end of a rotary kiln 1 is connected through a riser pipe 2 to a suspension preheater of the cyclone type, comprising cyclones 3, 5, 7 and 9, connecting pipes 4, 6 and 8 and feed pipes 3', 5', 7', and 9', for precipitated raw materials. From the top cyclone 9 a pipe 10 leads to a fan 11 which produces the partial vacuum that is necessary for drawing the gases through the kiln and the cyclone preheater. The delivery side of the fan communicates through a pipe 12 with an electrostatic dust precipitator 13, from which the cleaned gas is passed through a pipe 14 to a chimney (not shown) and so to the atmosphere. The dust precipitated by the dust precipitator is removed from it by means of a screw conveyor 15.

The by-pass provided according to the invention consists of a pipe 16' running from the riser pipe 2 to a drying chamber 17 and a pipe 16" running from the chamber 17 to meet the pipe 10. The drying chamber is a so-called atomizing or spray dryer. The flow of gases through the pipe 16' is controlled by a valve 18, which may be either an on-off valve or a regulating valve. Although the pipe 16' is shown inclined in the diagrammatic drawing, it is desirable that it should be approximately vertical and as short as possible.

At the top of the drying chamber 17 there is a device for the atomization of water into the gases flowing through the chamber. This device may be of any convenient construction, but as shown it is a horizontal, hollow, water-filled disc 19 provided with nozzles along its edge and kept in rapid rotation by means of a motor 20. Water is fed to the disc 19 through a pipe 21 having a regulating valve 22, and the water is ejected centrifugally in an atomized state through the nozzles. The dust in the gases is struck by the atomized water, and liquified and volatilized compounds contained in the gases unite with or condense on the drops of water. Since the gases from the kiln are very hot, being at a temperature of 800° to 1,100°C, the water is quickly evaporated but the solid or liquified particles which have been struck by the water or caused to condense by it drop downwards to settle on the bottom of the chamber and are discharged from it through a rotary gate valve 23 into a screw conveyor 24.

The construction and operation of the cyclone preheater are conventional, the raw materials being introduced at 25.

It will be understood that either the valve 18 or the valve 22 or both may be regulated as described above, preferably automatically. To this end a flame photometer 26 is inserted in the pipe 16' to sense the amount of alkalis in the gases, and a temperature sensor is provided in the pipe 16" at 27.

The material removed by the screw conveyor 15 will usually have an adequately low content of alkalis to permit its reintroduction into the rotary kiln together with fresh raw materials, but the material removed by the screw conveyor 24 has too high an alkali content to permit it to be returned directly. It may therefore be rejected, be used directly as a fertilizer or be added to other ingredients, or it may be leached and thus be relieved of alkali and subsequently be fed to the rotary kiln.

The spray dryer shown is very suitable for removing alkalis and other impurities from the by-pass stream at reasonable cost.

The apparatus shown in FIG. 2 deviates from that shown in FIG. 1 in that the spray dryer is designed for being fed with a suspension in water of a pulverulent material instead of being fed with pure water. To this end the water feed pipe 21 with regulating valve 22 does not lead to the drying chamber (spray dryer) 17, but to a turbomixer 28 in which the water is mixed intimately with the pulverulent material so as to form a suspension which through a pipe 29 is fed into the rotating hollow disc (spray wheel with nozzles) 19.

The pulverulent material serving as carrier material in the spray dryer 17 in FIG. 2 is a pulverized fertilizer the effect of which may be improved by an addition of alkalis. This fertilizer is added to a hopper 30 at the bottom of which a dosing gate valve 31 is provided. From this valve the material falls by gravity through a pipe 32 into the turbomixer 28.

In the spray dryer 17 the water is evaporated with the result that the gases lead to the said dryer by the pipe 16' are cooled and moistened before passing out into the pipe 16'' and the alkalis contained in the said gases condense on or agglomerate to solid particles remaining from the suspension when the water has evaporated. These alkali-enriched fertilizer particles sink to the bottom of the dryer 17 and are through gate valve 23 passed out into a pipe 33 which brings them to their destination, such as a receptacle of some kind (not shown).

The apparatus shown in FIG. 3 is also arranged for a carrier material to be added to the water fed to the spray dryer 17 and this is why a turbomixer 28 with auxiliary equipment is also provided in this case.

However, in the present instance the secondary aim of the invention is not alkali-enrichment of a fertilizer and so another carrier material other than a fertilizer poor in alkalis is used, viz. some filtrable material such as sand or part of the available cement raw materials. This means that the plant should advantageously be equipped with means serving to obtain in pure form the alkalis caught in the spray dryer 17 from the gases passing therethrough and to recover for re-use the sand or raw materials added.

With these objects in mind a pipe 33 connects the rotating gate valve 23 provided at the bottom of the spray dryer 17 with a turbomixer 34 thus receiving continuously the pulverulent alkali-containing material produced in the spray dryer 17. Through a pipe 35 with regulating valve 36 water is likewise fed to the turbomixer 34, in which a suspension or slurry is consequently produced which continuously leaves the bottom of the turbomixer through a pipe 37 leading to a vacuum filter 38 with rotating sieve drum.

In the filter 38 the slurry received from the turbomixer is separated into two fractions, one poor in water and taking the form of a slurry or filter cake, the other poor in solid matter and consisting essentially of water in which the alkalis are dissolved. The slurry or filter cake leaves the vacuum filter 38 through a mouth 39 and may be used in the process again.

If sand is being used as carrier material, the cake will be composed essentially of sand and so the cake material may be mixed with fresh sand brought to the hopper 30.

If, on the other hand, cement raw materials are used as carrier material the cake material may either be mixed with the fresh cement raw materials added at 25, or it may join the preheated cement raw materials coming from the pipe 3' and pass into the rotary kiln 1 together therewith.

The other fraction resulting from the separation performed in the filter 38, i.e. the water with alkalis dissolved therein, is pumped out of the filter by means of a vacuum pump 40. The alkalis may be recovered therefrom by vaporizing the water.

In the plant shown in FIG. 4 part of the pulverulent alkali containing material discharged from the spray dryer 17 is used as carrier material suspended in the water fed to the spray dryer through the pipe 29. To do this a pipe 41 is connected to the rotary gate valve 23 provided at the bottom of the spray dryer 17, and in this pipe an adjustable flap 42 is provided. Its position at any given time will determine the ratio between the amounts of material passing downwardly per time unit along the left and the right side of the said flap, respectively.

The material passing along the left side will fall by gravity through a pipe 43 into a turbomixer 34, to which also water is fed through a pipe 35 with regulating valve 36. A centrifugal pump 45 forces the slurry formed in the turbomixer 34 through a pipe 29 leading to the rotating disc 19 in the spray dryer 17, in which the suspended material will act as carrier material as previously described.

The material passing along the right side of the flap 42 will move by gravity into a pipe 44 leading away this fraction, which may be treated as explained in the above description in connection with FIG. 3 in respect of the material carried out of the spray dryer 17 through the gate valve 23 and the pipe 33.

I claim:

1. The method of making cement clinker in a rotary kiln equipped with a cement raw materials suspension preheater from cement raw materials having an undesired high content of alkalis in which at least part of the hot effluent gases from the rotary kiln is caused to by-pass the raw materials suspension preheater as a separate divisional flow, comprising the steps of, injecting water in an atomized state directly into the bypassing stream in such amount that substantially all the alkalis entrained in the bypassing stream in the form of solids, liquid or vapour are struck by the fine drops of atomized water, and substantially all the water is vaporized in the hot flow of gas so that a substantial part of the alkalies is precipitated from the bypassing gas flow in the form of a fine dry alkaline powder and sinks in the gas under the influence of gravity and is collected and carried away whereas the cooled gas flow is directed into the atmosphere.

2. The method according to claim 1, characterized in that the water atomized into the bypassing flow of effluent gas contains suspended fine particles of a carrier material to which a part of the alkalis clings at the vaporization of the water so that alkali-enriched carrier material will be incorporated in the fine dry powder precipitated from the gas flow.

3. The method according to claim 2, characterized in that the carrier material is constituted of a pulverised fertilizer the fertilizing effect of which is improved by an addition of alkalis, by which the fine dry powder precipitated from the gas flow becomes a fertilizer powder thus enriched in alkalis.

4. The method according to claim 2, characterized in that the carrier material is constituted by a certain fraction of the fine dry alkali powder previously precipitated from the gas flow.

5. The method according to claim 2, characterized in that the carrier material is a readily filtrable substance which will thus constitute a part of the fine dry alkali-containing powder precipitated from the gas flow in which the powder is suspended in water, the suspension being subsequently filtered so as to produce a cake of slurry containing the carrier material and impurities from the effluent gases, and water in which the alkalis are dissolved.

6. The method according to claim 5, in which the readily filtrable substance is sand.

7. The method according to claim 5, in which the filtrable substance is cement raw materials.

8. The method according to claim 1 in which the bypassing gas flow constitutes from about 2 percent to about 12 percent of the undivided gas flow.

9. The method according to claim 1 in which the gas flow bypassing the raw materials flow is intermittent.

10. The method according to claim 1 in which the amount of gas bypassing the raw materials preheater is varied automatically according to the alkali content of the gases leaving the rotary kiln so that the higher the alkali content of the gases the greater the amount of gas bypassed.

11. The method according to claim 1 in which the amount of water atomized into the bypassing flow of exit gas is varied according to the amount of exit gas bypassing the raw materials preheater.

12. The method according to claim 1 in which the amount of water atomized into the bypassing flow of exit gas is varied according to the temperature of said bypassing flow after it has given off heat during said spray drying.

13. A rotary kiln plant comprising a rotary kiln, a raw materials suspension preheater coupled thereto, an effluent gas bypass pipe bypassing the suspension preheater, a spray dryer in the bypass pipe, means for introducing water into the spray dryer in the form of very fine drops, and means for collecting and removing the greater part of the resulting precipitated alkalis in the form of a fine dry powder.

14. A rotary kiln plant according to claim 13 which further comprises an electrostatic dust precipitator arranged to receive the flow from the suspension preheater for raw materials.

15. A rotary kiln plant according to claim 14, in which the effluent gas outlet pipe of the suspension preheater and the effluent gas bypass pipe are both connected to the electrostatic dust precipitator.

16. A rotary kiln plant according to claim 13 which includes a turbomixing apparatus for suspending solids in a liquid, means for feeding carrier material and water to the turbomixing apparatus and means for conveying the water with the carrier material suspended therein from the turbomixing apparatus to the spray dryer.

17. A rotary kiln according to claim 16, in which the means for collecting and removing precipitated alkalis in the form of a fine dry powder include means for dividing the flow of said powder into two divisional flows, preferably in amounts regulable in relation to each other, and means for feeding one of the flows to the turbomixing apparatus.

18. A rotary kiln plant according to claim 16, which includes a filtering device, means for removing from the turbomixing apparatus the suspension therein and means for carrying away the filter water and the filter cake.

19. A rotary kiln plant according to claim 13 including means for feeding water, with suspended carrier material therein, to the spray dryer.

20. A rotary kiln plant according to claim 17, including means for causing the amount of effluent gas passing through the bypass pipe to be regulated automatically according to the alkali content in the exit gases leaving the rotary kiln.

21. A rotary kiln plant according to claim 19 which further comprises means for regulating automatically the supply of liquid to the spray dryer according to the amount of effluent gas bypassing the suspension preheater.

22. A rotary kiln plant according to claim 19 which includes in addition means for regulating automatically the supply of liquid to the spray dryer according to the temperature of the effluent gases after they have passed through the spray dryer.

* * * * *